United States Patent [19]
Corney

[11] 4,447,769
[45] May 8, 1984

[54] REDUNDANT ACTUATION SYSTEM

[75] Inventor: John M. Corney, Kent, England

[73] Assignee: Elliott Brothers (London) Limited, England

[21] Appl. No.: 340,835

[22] Filed: Jan. 19, 1982

[30] Foreign Application Priority Data

Mar. 11, 1981 [GB] United Kingdom ................. 8107619

[51] Int. Cl.³ ............................................. G05B 9/02
[52] U.S. Cl. ................................ 318/564; 91/363 A; 244/194; 364/184
[58] Field of Search ..................... 91/363 A; 244/194; 364/184; 318/564

[56] References Cited

U.S. PATENT DOCUMENTS

| | | | |
|---|---|---|---|
| 3,054,039 | 9/1962 | Meredith | 244/194 X |
| 3,433,125 | 3/1969 | Gemmell | 91/363 A |
| 3,457,479 | 7/1969 | Varner | 318/564 X |
| 3,955,783 | 5/1976 | Glaze et al. | 91/363 A |

FOREIGN PATENT DOCUMENTS 1072525 6/1967 United Kingdom .

Primary Examiner—B. Dobeck
Attorney, Agent, or Firm—Kirschstein, Kirschstein, Ottinger & Israel

[57] ABSTRACT

A redundant actuator system in which some of the sub-actuators have a lower force capability than the other sub-actuators. The lower force capability sub-actuators are controlled by a common electrical control circuit while the other sub-actuators are each independently controlled by separate control circuits. A plurality of hydraulic supplies power the sub-actuators, each supply powering one lower force capability sub-actuator, and at least one other sub-actuator.

4 Claims, 1 Drawing Figure

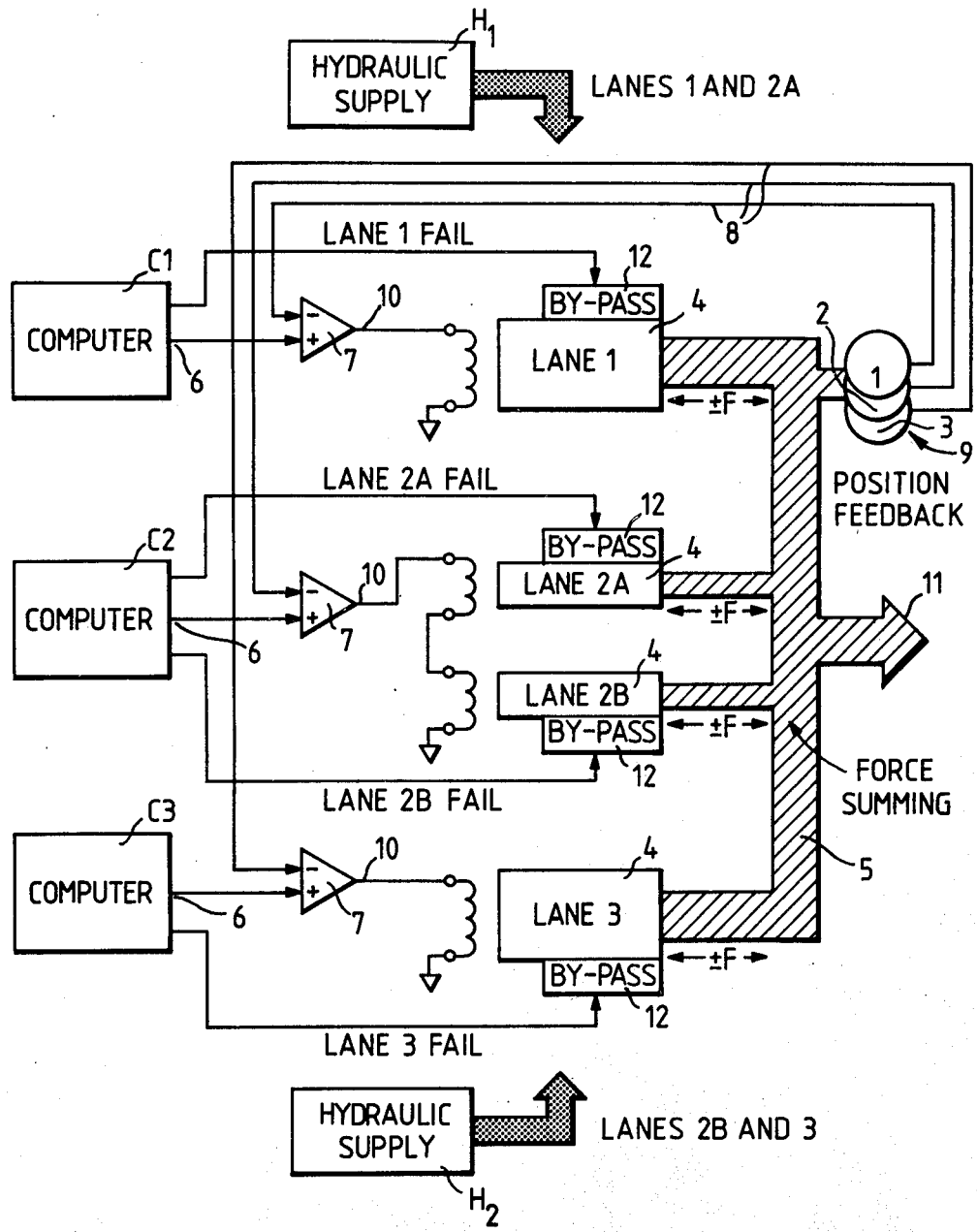

REDUNDANT ACTUATION SYSTEM

This invention relates to redundant actuator systems and especially, though not exclusively, to quadruplex electro-hydraulic redundant actuator systems. A redundant actuator system has a servo-mechanism which includes a plurality of independent actuation elements hereafter referred to as sub-actuators) whose mechanical outputs are coupled together in some way in order to produce a single common output. The reason for using sub-actuators is to enable one or more failures to be survived; this is achieved by the use of appropriate monitoring and isolation mechanisms.

High pressure hydraulic fluid is often used as the source of power for actuators. If the actuator is required to operate after a failure of a hydraulic supply then it is clearly necessary to provide more than one source of hydraulic supply. Similarly, if the actuator is required to operate after a failure of an electrical demand signal which controls the position of the actuator, it is also necessary to provide more than one electrical demand signal to the actuator.

It is an object of the present invention to provide a redundant actuator system which is designed so as to improve the likelihood that the system will continue to operate after loss of an electrical control signal.

It is further object of the invention to provide a quadruplex redundant actuator system employing electrohydraulic sub-actuators and provided with two independent hydraulic supplies and with three independent electrical control signals which is able to continue to operate after the loss of one hydraulic supply and one of the electrical control signals, or after the loss of two of the electrical control signals.

According to the invention there is provided a redundant actuator system comprising a plurality of sub-actuators in which some sub-actuators have a lower force capability than the remaining sub-actuator(s), and said sub-actuators with the lower force capability are controlled by a common single electrical control circuit, the remaining sub-actuator(s) being each controlled by a respective independent electrical control circuit.

In one particular such system using electrohydraulic sub-actuators there are provided a plurality of hydraulic supplies for powering the sub-actuators, each supply powering at least one lower force capability subactuator and at least one said remaining sub-actuator.

In one such particular arrangement there are four sub-actuators two of which have a lower force capability than the other two sub-actuators, one of the sub-actuators of lower force capability and one said other sub-actuator being powered by a first hydraulic supply, and the other sub-actuator of lower force capability and the remaining sub-actuator being powered by a second hydraulic supply. In such an arrangement said two sub-actuators of lower force capability suitably have equal force capabilities which are half that of the other two sub-actuators.

One redundant actuator system in accordance with the invention will now be described, by way of example, with reference to the accompanying drawing which is a schematic diagram of the system.

Referring to the drawing the system includes four sub-actuators 4 distinguished in the drawing by labels lane 1, lane 2A, lane 2B and lane 3 respectively. The sub-actuators 4 are mechanically coupled together by a force summing arrangement 5. Electrical demand inputs to the four sub-actuators are derived from three independent sources shown in the drawing as three computers $C_1$, $C_2$ and $C_3$.

The system is operated as a position control closed loop servo-mechanis. To this end three position demand signals on lines 6 are compared in comparators 7 with three position feedback signals on lines 8 produced by position sensors 9. The resulting three respective error signals on lines 10 are used to control the four sub-actuators as shown. The lane 1 error signal controls the lane 1 sub-actuator only; the lane 2 error signal controls both lane 2A and lane 2B sub-actuators; the lane 3 error signal controls the lane 3 sub-actuator only.

Two hydraulic supplies $H_1$ and $H_2$ are connected to the sub-actuators 4 in such a way that the lane 1 and lane 2A sub-actuators are powered by hydraulic supply $H_1$ whereas the lane 2B and lane 3 sub-actuators are powered by hydraulic supply $H_2$.

The lane 2A and lane 2B sub-actuators each have a maximum force output which is significantly lower than the maximum force output of either of the lane 1 and lane 3 sub-actuators. Typically the lane 1 and 3 sub-actuators each have a maximum force output of $\pm F$, whereas lane 2A and 2B sub-actuators each have a maximum force output of $\pm(F/2)$. The maximum force output available from each hydraulic sub-actuator is determined from considerations of piston areas and the hydraulic supply pressure.

The failure survival nature of the actuator is as follows:

If hydraulic supply $H_1$ should fail, then the lane 1 and 2A sub-actuators are no longer able to provide an output force. However the lane 2B and 3 sub-actuators are assumed to be responding correctly to their input demand signals and it is further assumed that the lane 1 and 2A sub-actuators offer only minimal frictional resistance to the motion applied by the correctly operating lane 2B and 3 sub-actuators. Therefore the common output 11 responds correctly despite the loss of one of the two hydraulic supplies to the actuator system.

If now there is a further failure caused by an electrical fault in either computer $C_2$ or $C_3$ or the corresponding position feedback signals on lines 8, then this fault is assumed to be detected by means which are not part of this invention and the or each sub-actuator with a faulty electrical control signal is isolated by a by-pass valve 12 (or other similar mechanism), so that it is unable to oppose the motion of the remaining "good" sub-actuators.

If now we consider failure of two of the electrical control signals without any failure of either of the hydraulic supplies, it can be seen that, assuming the isolation mechanism operates correctly, the third control signal will enable the associated sub-actuator(s) to continue to operate correctly. For example if there are failures in computors $C_1$ and $C_2$, the lane 1, lane 2A, and lane 2B sub-actuators will all be by-passed and the common output 11 will be correctly controlled by the lane 3 sub-actuator. If there are failures in computers $C_1$ and $C_3$, then the lane 1 and lane 3 sub-actuators will be bypassed, and the common output 11 will be correctly controlled by the lanes 2A and 2B sub-actuators.

The remaining failure combination that the system needs to be able to survive is that of an electrical failure resulting in inability to by-pass a lane sub-actuator, followed by a further electrical failure in the control signal associated with that lane. For example if a fault occurs such that the lane 1 sub-actuator is unable to be by-passed, and this is followed by a further failure such that an incorrect control signal is applied to lane 1 sub-actuator, then clearly this sub-actuator will attempt to move to an incorrect position. However the lane 1 sub-actuator is only able to exert a force of $\pm F$ whereas the remaining correctly operating lanes 2A, 2B and 3 sub-actuators are able to exert a force of $\pm 2F$. Therefore the incorrectly operating lane 1 sub-actuator will be overridden by the other correctly operating lane sub-actuators such that the common output 11 will continue to follow the correct position command.

If a fault occurs in computer $C_2$ such that neither lane 2A or lane 2B sub-actuator is able to be by-passed, and then a further fault occurs such that the control signal to lanes 2A and 2B sub-actuators becomes incorrect then similar consequences to the previously discussed failure combination will occur. The common output 11 will respond correctly to the lanes 1 and 3 demands because the lanes 2A and 2B sub-actuators which have a total force capability of $\pm F$, will be overriden by the lane 1 and lane 3 sub-actuators which have a total force capability of $\pm 2F$.

It will be appreciated that the above is not an exhaustive list of all the combinations of faults possible, but is merely an indication of how the quadruplex redundant electro-hydraulic actuation system described by way of example is able to meet the requirements that it is able to continue to operate after the loss of one hydraulic supply and one of the electrical control signals, or after the loss of two of the electrical control signals.

I claim:

1. A redundant actuator system comprising: a first plurality of sub-actuators in which some sub-actuators have a lower force capability than the remaining sub-actuator(s); and a second plurality of electrical control circuits which control the sub-actuators, said sub-actuators with the lower force capability being controlled by a common single electrical control circuit, the remaining sub-actuators being each controlled by a respective independent electrical control circuit.

2. A redundant actuator system according to claim 1 in which the sub-actuators are electro-hydraulic subactuators, and there are provided a plurality of hydraulic supplies for powering the sub-actuators, each supply powering at least one lower force capacity sub-actuator and at least one said remaining sub-actuator.

3. A redundant actuator system according to claim 2 in which there are four sub-actuators, two of which have a lower force capability than the other two sub-actuators, one of the sub-actuators of lower force capability and one said other sub-actuator being powered by a first hydraulic supply, and the other sub-actuator of lower force capability and the remaining sub-actuator being powered by a second hydraulic supply.

4. A redundant actuator system according to claim 3 in which said two sub-actuators of lower force capability suitably have equal force capabilities which are half that of the other two sub-actuators.

* * * * *